Z. KEOUGH.
AUTOMOBILE DIRECTION SIGNAL OR INDICATOR.
APPLICATION FILED SEPT. 3, 1913.
1,154,024.  Patented Sept. 21, 1915.
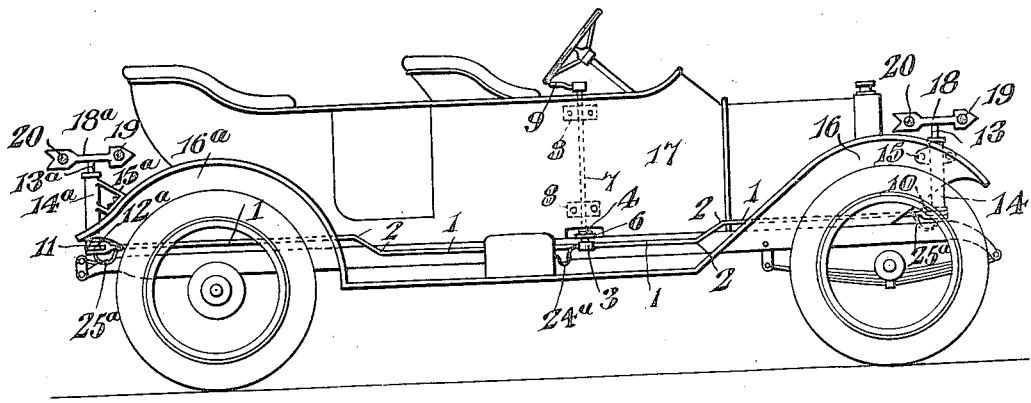
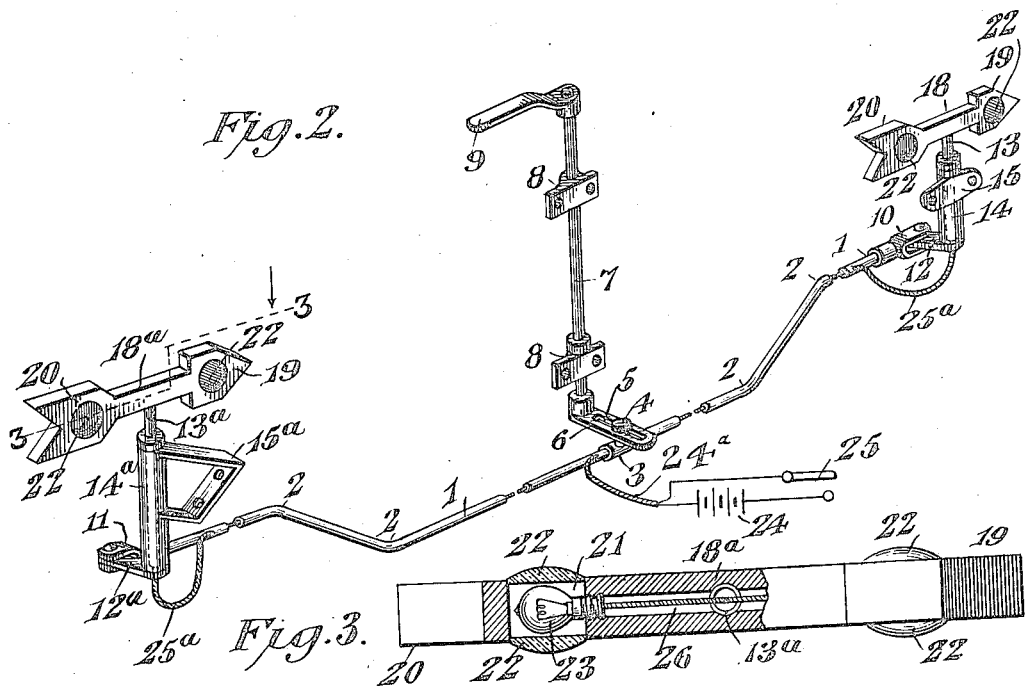
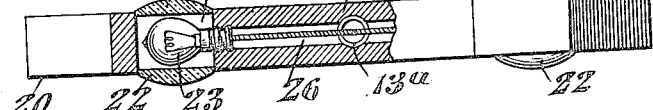
Zachariah Keough, INVENTOR
WITNESSES
BY
ATTORNEY

UNITED STATES PATENT OFFICE.

ZACHARIAH KEOUGH, OF LOS ANGELES, CALIFORNIA.

AUTOMOBILE DIRECTION SIGNAL OR INDICATOR.

1,154,024.

Specification of Letters Patent. Patented Sept. 21, 1915.

Application filed September 3, 1913. Serial No. 787,932.

*To all whom it may concern:*

Be it known that I, ZACHARIAH KEOUGH, a citizen of the United States, residing at Los Angeles, in the county of Los Angeles and State of California, have invented a new and useful Automobile Direction Signal or Indicator, of which the following is a specification.

This invention has reference to improvements in automobile direction signals or indicators, and its object is to provide a means attachable to both the front and rear portions of an automobile and under the control of the operator of the vehicle to indicate to others the intended direction of travel of the vehicle, especially where it is the desire of the operator to turn the vehicle to one side or the other.

In accordance with the present invention visual direction indicators are mounted both in front of and at the rear of the vehicle body, and both are movable from the operator's seat, so that any one in front of the vehicle or any one in rear of the vehicle will be apprised of the fact that the vehicle is about to turn in one direction or the other, as indicated. Furthermore, provision is made for illuminating the visual members at night and by the employment of suitable colors the observer may take notice of the intended direction of turn of the vehicle.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an elevation of an automobile showing the invention attached. Fig. 2 is a perspective view of the indicating attachment. Fig. 3 is a section on the line 3—3 of Fig. 2 but drawn on a larger scale.

Referring to the drawings there is shown a rod 1 of sufficient length to reach from the front to the rear of an automobile, and this rod may have bends 2 wherever necessary to accommodate it to the vehicle. At an intermediate point of the rod 1 there is provided a collar 3 from which projects a stud 4 extending through an elongated slot 5 in a rock arm 6 fast to the lower end of an upright rod 7 mounted in bearings 8 for rocking movement, the upper end of the rod being provided with a manipulating handle 9, whereby the rod may be rocked about its longitudinal axis. Such rocking of the rod 7, which is in fact a rock shaft, causes the arm 6 to impart to the rod 1 a longitudinal movement of such extent as may be necessary. Each end of the rod 1 has a fork extension 10, 11, respectively, the fork 10 straddling a rock arm 12 on one end of a rock shaft 13 mounted in an elongated bearing 14 fast to a bracket 15 constructed for attachment to any suitable part of the vehicle, say, the front hood 16 of an automobile 17 shown in Fig. 1. The rock shaft 13 carries at the upper end an indicator member 18 in the form of an arrow or pointer in the particular structure shown in the drawings, but it will be understood that any suitable indicating device may be employed. The rear fork 11 is pivotally secured to the free end of a rock arm 12$^a$ on one end of a rock shaft 13$^a$ mounted in an elongated bearing 14$^a$ having a bracket 15$^a$ fast thereto, whereby the bearing 14$^a$ may be attached to the rear wheel guard 16$^a$ of the vehicle or to any other suitable part. The rear shaft 13$^a$ carries an indicator 18$^a$ like the indicator 18 carried by the shaft 13.

Assuming that the indicators are in the form of arrows, then in the head portion 19 and tail portion 20 of each arrow there is a transverse passage 21 closed at the ends by transparent members 22 which may be in the form of the familiar bull's eye lenses. In each passage 21 there is mounted an incandescent electric lamp 23 fed by current from a battery 24 which may be the usual sparking battery of the vehicle, or the battery employed for lighting head and tail lamps, and from this battery there extends a conductor 24$^a$ which may be of the usual double type, including a switch 25 which may be located within convenient reach of the operator of the vehicle. The conductor 24$^a$ is carried through the rod 1, which is made hollow or tubular for the purpose, and near the ends the conductor is looped out, as indicated at 25$^a$, and from thence is carried through the shafts 13 and 13$^a$ which are made hollow for the purpose and extends through a passage 26 lengthwise of each indicator 18 and 18ᵃ to the lamps 23. The bull's eyes 22 may be made of green glass for the arrow heads 19 and red glass for the tails 20 or any other suitable color arrangement may be provided.

The arm 12 is so related to the arm 6 that a movement of the arm 6 through an arc of 90° will cause a like movement of the arrow 18 and the arm 12ᵃ is so related to the arm 6 that a movement of 90° of the arm 6 will cause a like movement of the arrow 18ᵃ, while the two arrows are so related one to the other that their movements synchronize.

Of course, the particular structures described are not absolutely essential to the invention, but other arrangements may be employed whereby the purposes of the invention are carried out so that the proper indications are made apparent to the observer.

Suppose that the vehicle is traveling straight ahead, then the handle 9 is so located that the arrows or indicators point in the direction of travel. Suppose now that it is desirable to turn the vehicle to one side or the other of the direct line of travel, as, for instance, it is intended to turn a corner or to move from one side of the street or road to the other, the operator moves the handle 9 in the proper direction and the arrows also move, so that their heads point toward the direction of intended travel and persons in front of the vehicle, as well as those to the rear of the vehicle, are apprised of the intentions of the operator. At night a switch 25 is closed, whereupon the lamps 23 glow and signal lights are displayed, and these signal lights by their relative positions under the well known marine rules indicate in what direction the vehicle is about to turn.

The device is intended to prevent traffic accidents by apprising approaching vehicles from the front or rear, and also pedestrians, as to the intended course of the vehicle, thus preventing accidents and avoiding the necessity of the operator using one hand as a signal means, which last-named signal means is ineffective at night for it cannot be seen.

According to the rules on the road the automobiles travel upon one side only in going in one direction, while those going in the other direction travel upon the other side of the road, the right hand side of the road in the direction of travel being the customary side upon which the vehicle is moving. Now, if the vehicle is to turn, say, to the right, the indicating means are moved through an arc of about forty-five degrees, thus showing that the vehicle is about to turn to the right. By moving the indicating means through an arc of ninety degrees the indicating means will be set transversely of the vehicle, and thus indicate a stop, except that where the indicating means have one end differing from the other, as would be the case with an arrow, a turning of the head of the arrow toward that side of the vehicle remote from the side occupied by the indicating means with the arrow in the ninety degree or full transverse position, would indicate that the vehicle is about to turn around in order to move on to the other side of the street to travel in the opposite direction.

Instead of having the rod 1 of a fixed length as it might be if applied to an automobile when built, it may be made longitudinally adjustable so as to be adaptable to vehicles of different lengths. For this purpose the sleeve or collar 3 may be appropriately elongated and the rod 1 be then made in two lengths with the adjacent ends telescoping into the ends of the long sleeve 3 and there held by set screws or clamp nuts or otherwise. Furthermore, the rod 7 may be made telescoping so as to be longitudinally adjustable in the same manner as stated with reference to the rod 1. It is also quite feasible to operate the direction signals or indicators electrically.

What is claimed is:—

1. A direction indicator for automobiles, comprising rotatable members located at opposite ends of the vehicle, each member having simultaneously operable spaced light giving means with different light characteristics, and operating means for the rotatable members connected to both for the simultaneous actuation thereof.

2. A direction indicator for automobiles, comprising elongated direction-indicating members each rotatable on an axis perpendicular to its length and said members being located at opposite ends of the vehicle, each member having simultaneously operable light giving means, spaced apart in the direction of the length of said member, and operating means for the rotatable indicating members connected to both for the simultaneous actuation thereof, the spaced light giving means having different light characteristics to indicate the direction of intended movement of the vehicle.

3. An automobile direction signal or indicator comprising arrow-like members each disposed in a substantially horizontal position and mounted on a vertical shaft or spindle, one member at the front and the other at the back of an automobile, and means for operating the shafts so as to shift the arrow-like members in substantially horizontal planes and in unison toward the same side of the vehicle, said arrow-like members each being provided with differently colored light-giving means at the head and tail portions thereof.

4. A direction signal or indicator for automobiles, comprising indicating means provided with differently colored light giving means spaced apart in a substantially horizontal plane in fixed relation one to the other, said indicator being shiftable in a horizontal plane to reverse the order of the spaced lights with reference one to the other and to the automobile.

5. An automobile direction signal or indicator comprising an arrow-shaped body provided with a vertically arranged support about the axis of which the arrow is movable in a horizontal plane, said arrow having electric lamps located in the head and tail portions thereof with bull's eye lenses on opposite sides for the escape of light therethrough, and means for shifting the arrow into different positions in a horizontal plane.

6. An automobile direction signal or indicator comprising an arrow-shaped body provided with a vertically arranged support about the axis of which the arrow is movable in a horizontal plane, said arrow having electric lamps located in the head and tail portions thereof with bull's eye lenses on opposite sides for the escape of light therethrough, and means for shifting the arrow into different positions in a horizontal plane, the bull's eyes at the head of the arrow being of a characteristically different color from those at the tail of the arrow.

7. An automobile direction signal or indicator provided with a hollow arrow-shaped body mounted for movement in a horizontal plane about an upright axis, said body having head and tail portions each provided with bull's eye lenses on opposite sides, and electric lamps housed within the head and tail portions of the arrow-shaped body intermediate of the bull's eyes at the corresponding ends of the body.

In testimony, that I claim the foregoing as my own, I have hereto affixed my signature in the presence of two witnesses.

ZACHARIAH KEOUGH.

Witnesses:
 EARLE J. BLAKESLEE,
 LAUREL S. BLAKESLEE.